Figure 1:
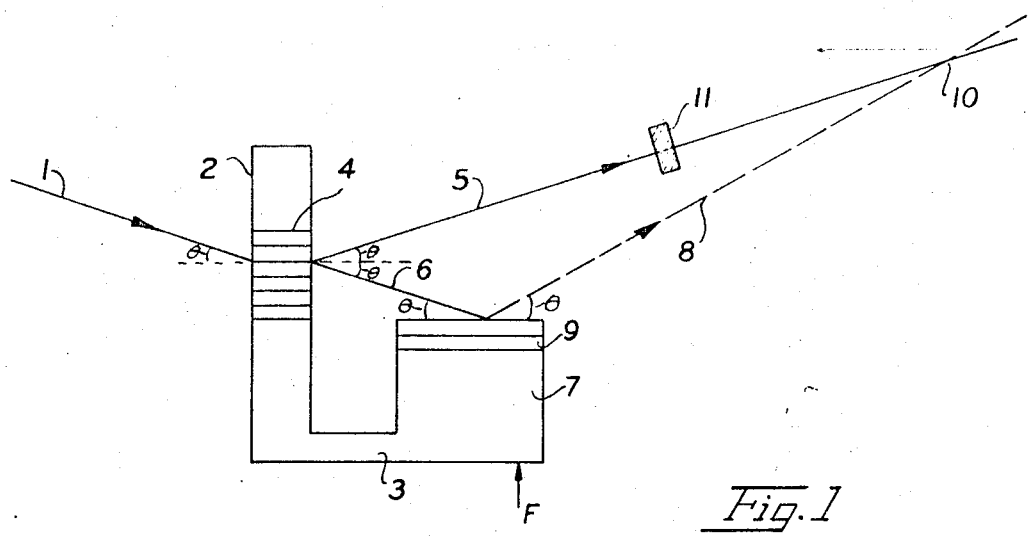

United States Patent                                                      [11] 3,591,803

| [72] | Inventors | Nathan Spielberg<br>Hartsdale;<br>Dominick J. DeBitetto, Briarcliff Manor;<br>Ralph S. Levitt, Ossining, all of, N.Y. |
|---|---|---|
| [21] | Appl. No. | 867,987 |
| [22] | Filed | Oct. 16, 1969 |
| [45] | Patented | July 6, 1971 |
| [73] | Assignee | U.S. Philips Corporation<br>New York, N.Y.<br>Continuation of application Ser. No.<br>653,221, July 13, 1967, now abandoned. |

[54] METHOD OF OBTAINING X-RAY INTERFERENCE PATTERNS
4 Claims, 2 Drawing Figs.

[52] U.S. Cl............................................................ 250/65, 250/51.5
[51] Int. Cl............................................................ G01n 23/20
[50] Field of Search............................................. 250/51.5, 65

[56] References Cited
UNITED STATES PATENTS

| 2,999,931 | 9/1961 | Zingard | 250/51.5 |
| 3,381,127 | 4/1968 | Spielberg | 250/65 |

Primary Examiner—William F. Lindquist
Attorney—Frank R. Trifari

ABSTRACT: A method of obtaining X-ray interference patterns in which a crystal exhibiting the Borrmann effect, i.e., anomalously high transmission of X-rays by means of diffraction yielding a forward diffracted and a reflected diffracted ray, is employed and subsequently one of these rays is Bragg reflected causing it to converge with and interfere with the other ray.

METHOD OF OBTAINING X-RAY INTERFERENCE PATTERNS

This application is a continuation of application Ser. No. 653,221, filed July 13, 1967, now abandoned.

The invention relates to a method of obtaining an X-ray interference pattern which may be recorded as a hologram which may then be reconstructed by means of coherent visible, infrared or other radiation to produce a magnified image of the object.

In copending application Ser. No. 444,547, filed Apr. 1, 1965, now U.S. Pat. No. 3,381,127 a method of obtaining an X-ray interference pattern is disclosed and claimed. In the method disclosed in that application a highly perfect thick crystal which exhibits the Borrmann effect is employed to diffract from parallel planes two beams of coherent X-rays of the same wavelength. The diffracted rays converge to a common point where the rays may interfere. A film or other recording medium may be employed to obtain a permanent record of the interference pattern and this record may be reconstructed with coherent visible, infrared, or other radiation to produce a magnified image of an object in the path of one of the rays.

The present invention provides an alternative method for producing X-ray interference patterns and/or holograms which has the advantage that the angles of convergence of the interfering rays is only a few seconds of arc with the result that interference fringe spacings are very greatly increased over the former method thereby reducing the resolution requirement of the recording medium.

In accordance with this invention, a relatively thick highly perfect crystal exhibiting the Borrmann effect is also employed to obtain an X-ray interference pattern but using successive Laue and Bragg reflections.

In order to achieve this sequence of reflections, the crystal must be constituted of two portions, preferably together forming an L-shaped body. A monochromatic beam of X-rays incident on one portion of the crystal at the proper Bragg angle is diffracted by a set of crystallographic planes. If the crystal is sufficiently perfect to exhibit the Borrmann effect, two rays will be diffracted, one of which is the forward diffracted ray, and the other the reflected diffracted ray. If the second portion of the crystal is positioned to receive the forward diffracted ray and to reflect it by Bragg reflection so that it converges with the reflected diffracted ray, an interference pattern will result, the nature of which will depend upon the phase relationships of the respective rays. These phase relationships may be altered by placing an object in either ray path. If an object which will scatter X-radiation is placed in the path of either of these reflected rays, an X-ray hologram may be recorded on a film located at the point of convergence of the reflected rays. This hologram may be reconstructed by means of coherent visible, infrared, or other radiation to produce a magnified image of the object. It may be necessary to insert in one of the ray paths a means of insuring that the difference in optical path lengths of the two rays does not exceed the coherence length of the original X-ray beam.

Figure 2:
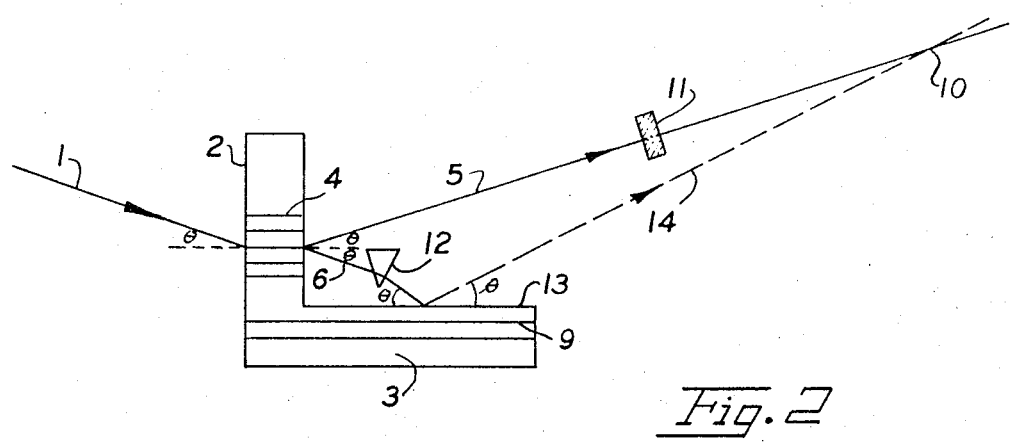

The invention will be described with reference to the accompanying drawing in which:

FIG. 1 shows one embodiment of the invention; and
FIG. 2 shows another embodiment of the invention.

Referring to the drawing, a beam of monochromatic X-rays 1 is incident on the upper portion 2 of a crystal 3 (FIG. 1) sufficiently thick and highly perfect to exhibit the Borrmann effect. This beam of X-rays is diffracted by a set of crystal lattice planes 4 (e.g., 220 in Ge or Si) resulting in the emergence of two rays 5 and 6. The forward diffracted ray 6 is intercepted by portion 7 of crystal 3. If ray 6 is incident at the correct Bragg angle, a ray 8 will be reflected by crystal lattice planes 9; the latter ray then will converge with ray 5 to a common point 10 at which a recording medium such as a film (not shown) sensitive to X-rays may be positioned.

In order to ensure that ray 6 is incident at the proper angle on crystal portion 7 for a Bragg reflection, a force, shown by arrow designated F, must be applied to rotate that portion by a few seconds of arc, e.g., 3 seconds of arc. This will cause reflected ray 8 then to converge with ray 5 at an angle of convergence of 6 seconds of arc. This will result in an interference pattern well within the resolution capabilities of modern photographic films.

By placing an object 11 in the path of ray 5 a phase change relative to ray 8 will be introduced giving rise to an interference pattern at 10. Alternatively, the object 11 may be placed in the path of ray 8. Consequently, a hologram of object 11 can be recorded on the film at 10 which may be subsequently reconstructed by means of coherent visible, infrared, or other radiation to produce a magnified image of the structure of object 11.

Instead of bending crystal portion 3, ray 6 may be refracted 3 seconds of arc by wedge 12 (FIG. 2) before striking crystal face 13 so that a ray 14 is reflected by the crystal lattice planes which converges with ray 5 at an angle of 3 seconds of arc at point 10. In this embodiment, object 11 may be interposed in the path of ray 5, or ray 14, to shift the phase of ray 5 relative to ray 14 and produce an interference pattern at point 10.

The angle of convergence may be altered by inserting a refracting wedge into either ray 5 or ray 8 (FIG. 1), or ray 14 (FIG. 2). This would considerably shorten the total length of the ray paths thereby making the instrument smaller and mechanically more stable.

While the invention has been described with reference to particular embodiments and applications thereof, other modifications will be readily apparent to those skilled in the art without departing from the spirit and scope of the invention as defined in the appended claims.

We claim:

1. A method of obtaining an X-ray interference pattern comprising the steps of directing a monochromatic beam of X-rays at a given set of crystal lattice planes of a first portion of a highly perfect perfect crystal, diffracting said beam by said planes into two divergent rays which emerge from said first portion, one of said diffracted rays emerging in a direction in which it is not interrupted by any other portion of the crystal, intercepting and reflecting the other of said diffracted rays by the crystal lattice planes of a second portion of said crystal which is spaced from said first portion, increasing the angle a few seconds of arc relative to the reflecting surface of said second portion at which said other diffracted ray is intercepted and reflected such that the reflected ray from said second portion converges with said one diffracted ray, modifying the length of the path of one of said diffracted rays emerging from the first portion to alter the phasal relationship between the wave in the diffracted and the reflected rays to thereby produce an interference pattern at the point of convergence, and recording said interference pattern.

2. A method of obtaining an X-ray interference pattern as claimed in claim 1 wherein the step of increasing the angle at which said other diffracted ray is intercepted and reflected by said second portion is performed by applying force to said second portion of the crystal to rotate the crystal lattice planes of said second portion a few seconds of arc relative to the crystal lattice planes of said first portion thereby changing the point of convergence of the one diffracted ray and the other diffracted ray reflected by said second portion.

3. A method of obtaining an X-ray interference pattern as claimed in claim 1 wherein the step of increasing the angle at which said other diffracted ray is intercepted and reflected by said second portion is performed by inserting a refracting wedge in the path of said other diffracted ray between said first and second portions of the crystal to bend the beam a few seconds of arc thereby moving the point of convergence of said one diffracted ray and said reflected ray.

4. A method of obtaining an X-ray hologram of an object comprising the step of inserting the object in the path of one of said diffracted rays obtained in the method as claimed in claim 1 and recording a hologram at the point of convergence of said diffracted rays.